March 22, 1932.   N. C. HUNT   1,850,879

VALVE AND COUPLING

Filed April 25, 1930   2 Sheets-Sheet 1

Inventor
Nathan C. Hunt
By Frease and Bishop
Attorneys

March 22, 1932.   N. C. HUNT   1,850,879
VALVE AND COUPLING
Filed April 25, 1930   2 Sheets-Sheet 2

Inventor
Nathan C. Hunt
By Frease and Bishop
Attorneys

Patented Mar. 22, 1932

1,850,879

UNITED STATES PATENT OFFICE

NATHAN C. HUNT, OF SALEM, OHIO

VALVE AND COUPLING

Application filed April 25, 1930. Serial No. 447,309.

The invention relates to valves and couplings for pressure lines utilized in transferring air or water under pressure from place to place. Such air pressure lines include among others, those used for operating pneumatic tools, those used in connection with various types of foundry equipment, and those used in carrying out spray painting. Such water pressure lines include among others, various types of hose lines, sprinkling system lines, and lines used by road and building contractors.

Numerous valves of the cock type have been made in the past for use in pressure lines, but cock type valves usually include a tapered valve body and valve seat which must be very accurately fitted together, and which only properly function for a short time, after which leakage occurs in the pressure line at the valve. Such prior types of cock valves have, however, been provided with means for bleeding the exhausting side of the line in which the valve is connected.

The applicant is also aware of the fact that hose couplings, comprising movable jaws provided on one hose connection for engagement with another hose connection, have been provided in the past for coupling lengths of pressure pipe lines together. Such couplings have also included means for sealing the joint between the two hose connections when the same are in coupled arrangement.

However, such prior types of hose couplings have sometimes presented a serious hazard when it has been attempted to disconnect associated lengths of hose while a fluid pressure was maintained therein; because oftentimes when the jaws were released, the fluid pressure blew the hose connections apart in such a manner that the operator was struck by one of the hose connections and injured thereby.

It is therefore an object of the present invention to provide a valve for a pressure line which may be readily, quickly, easily and almost instantaneously operated to cut off the flow of fluid under pressure through a pipe line without having any leakage whatsoever at the valve, regardless of the pressure in the line, whether it be one ounce or one thousand pounds more or less.

It is also an object of the invention to adapt such a valve for bleeding the exhausting end of the pressure line when the valve is in "off" position.

Moreover, it is an object of the present invention to provide sealing means for such a valve which is directly acted upon by the pressure in the line to increase its sealing capacity or effectiveness when the pressure in the line is increased, regardless of whether the valve is in "on" or "off" position.

Moreover, it is an object of the present invention to provide a valve in which the pressure in the line wherein the valve is located acts to hold the valve in the position at which it is set, regardless of whether the valve is in "on" or "off" position.

A further object of the present invention is to provide a valve such as has been described, in combination with a quick acting jaw type coupling, so arranged that the coupling cannot be disconnected when the valve is in "on" position; thus providing a coupling which is safe and which cannot produce any bodily injury upon being disconnected, because the pressure in the line must always be off before the coupling can be disconnected.

A further object of the invention is to provide such a valve and coupling, arranged so that the coupling can be locked in coupled position when the valve is in "off" position, in order to prevent pressure leakage at a tool or other appliance located in the exhausting side of the pressure line.

A further object of the present invention is to provide a valve and coupling construction involving the features above described, in which the valve may be instantaneously moved to "off" position, whereupon the coupling may be instantaneously disconnected.

A further object of the present invention is to provide a valve of the sleeve type which may be operated by the most inexperienced person from "on" to "off" position, either by a rotary or a longitudinal movement.

It is also an object of the present invention to provide means for protecting the packing portion of the constituent coupling connection members when the same are being connected or disconnected; said protecting means acting to accurately align the two cooperating connection members when being connected together.

And finally, it is an object of the present invention to provide a valve and coupling construction such as described in which the constituent parts are of an extremely simple design, cheap and easy to manufacture, and very efficient in use.

These and other objects may be attained by providing a construction, preferred embodiments of which are hereinafter set forth in detail, which may be stated in general terms as including a by-pass valve body, a valve sleeve, packing means interposed between the valve body and valve sleeve, the by-pass portion of the valve body being preferably arranged so as to bleed the exhausting side of the valve when the valve is in "off" position; and the foregoing valve may be combined with a coupling including a connection adapter member preferably associated with the valve body, another connection adapter member, clamping jaws mounted preferably on the valve body for connecting the connection members together, means for sealing the joint between the connection members, means for holding the jaws in clamping position when the valve is in "on" position, alternate means for either holding the jaws in clamping position when the valve is in "off" position, or for releasing the clamping jaws when the valve is in "off" position; and the foregoing coupling may also include sealing means provided with a protecting and aligning sleeve.

Several forms of the improved valve or valve and coupling are shown in the accompanying drawings forming part hereof, in which Figure 1 is a side elevation of the improved valve and coupling for use in either an air or water pressure line, the valve being shown in "on" position;

Similar numerals refer to corresponding parts throughout the various figures of the drawings.

Figure 4:
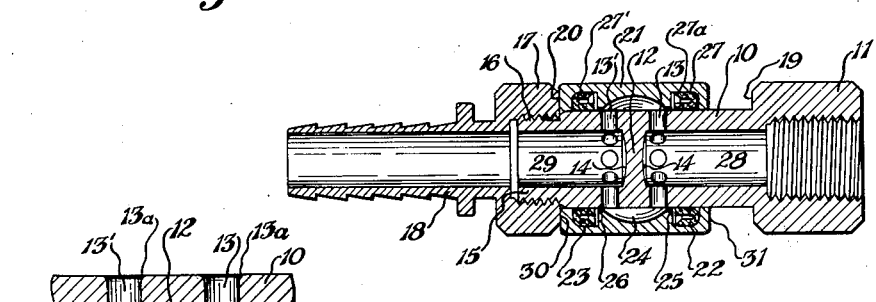
Fig. 4 is a longitudinal section through a valve of the improved type, the valve not being combined with a coupling.

The improved valve is shown in Fig. 4 in "on" position, and includes the valve body 10 provided with preferably an integral internally threaded pipe connection adapter member 11. The valve body 10 is preferably cylindrically tubular in shape having preferably an integral dividing or partition wall disk 12 formed intermediate its ends for interrupting the flow of any fluid medium therethrough.

The tubular walls of the valve body 10 are provided with a plurality of by-pass openings or ports 13 and 13', preferably arranged radially of the tubular valve body 10, adjacent each side face 14 of the disk 12.

One end 15 of the valve body 10 is preferably threaded at 16 for connection with the internally threaded portion 17 of a hose connection adapter member 18.

It is pointed out that any form of pipe or hose connection adapter member may be provided in order to meet the particular circumstances of the pressure line in which the valve is to be located, that is to say, the hose connection adapter member 18 and the pipe connection adapter 11 may be transposed so that the member 18 is on the right hand end of the valve body 10, and so that the member 11 is on the left hand end of the valve body 10. Likewise, both members 11 and 18 may be either hose connection adapter members, or pipe connection adapter members or any other form of connection adapter members required for use.

The only restriction upon the selection of and arrangement of connection adapter members resides in the fact that the annular face 19 of the member 11, and the annular face 20 of the member 18 must always be located, with reference to the disk 12 and by-pass ports 13 and 13' substantially as shown in Fig. 4 of the drawings, for a purpose which will hereinafter be described.

A valve sleeve 21 is preferably slidably and rotatably mounted on the tubular valve body 10 and is provided with two internal circumferential grooves 22 and 23 adjacent its end portions, there being a rounded internal circumferential groove 24 interposed between the grooves 22 and 23.

When the sleeve 21 is mounted on the valve body 10, sufficient clearance is provided at 25 and 26 for forming a communication between the groove 24, and the grooves 22 and 23 respectively, for a purpose which will be hereinafter described.

Flexible U-shaped channel packing rings 27 and 27' preferably formed of leather, are interposed between the valve body 10 and valve sleeve 21, and are located in the circumferential grooves 22 and 23 with the open side of the U of one packing ring 27 directed toward the open side of the U of the other ring 27'. It is pointed out that the upper annular edge of each packing ring 27 and 27' is bevelled at 27a in order to permit the body of leather to properly position and seat itself within the groove 22 or 23 without wrinkling.

The valve is shown in "on" position in Fig. 4, wherein the right hand side pressure compartment bore 28 of the valve body 10 is the pressure line side, while the left hand side exhaust compartment bore 29 of the valve body 10 is the exhaust line side. Thus if the valve were connected in a pressure line, fluid under pressure would enter the cylindrical bore 28 through the adapter connection 11, thence it would flow through the by-pass ports 13, along the chamber formed by the internal annular groove 24 of the valve sleeve 21, through the by-pass ports 13' and into the tubular bore 29, and thence out through the adapter member 18.

The full line pressure being present in the chamber formed by the groove 24 acts through the communications 25 and 26 upon the U-shaped leather packing rings 27 and 27' regardless of the position of the sleeve to force the inner circumferential surface of the packing rings tightly in sealing relation against the outer peripheral surface of the valve body 10. Thus as the pressure in the line increases, the effectiveness of the seals 27 and 27' also increases, so as to positively prevent any leakage of the valve.

The action of the line pressure on the U-shaped packing rings also functions to hold the valve sleeve at the position in which it is placed, because of the pressure of the inner surface of the U-shaped packing rings against the valve body 10. Accordingly, the valve will be unaffected by vibration and jarring, or by any accidental blow from some external force not intended for changing the position of the valve sleeve.

The annular face 20 of the connection adapter member 18 provides a stop or abutment for the left hand end face 30 of the valve sleeve 21 when it is desired to position the valve sleeve in "on" position as shown in Fig. 4, so that the fluid in the pressure line in which the valve is interposed may be by-passed through the ports 13 and 13' and along the passage formed by the groove 24.

It is only necessary to slide or rotate the valve sleeve 21 longitudinally of the valve body 10 so that the other end face 31 of the valve sleeve 21 abuts against the end face 19 of the member 11 in order to position the valve in "off" position so that communication between the ports 13 and 13' will be cut off.

The action of the valve in "off" position be fully described in connection with describing the valve forming part of the constructions shown in the remaining figures of the drawings.

Figure 9:
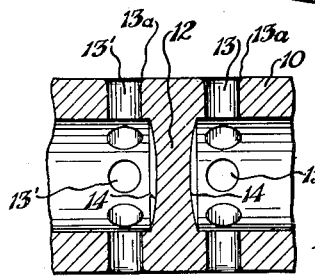
Fig. 9 is an enlarged fragmentary section through a portion of the improved valve body showing the manner in which the by-pass ports are burnished.

As shown in Fig. 9, the outer peripheral edges of the ports 13 and 13' are burnished to be rounded or curved as shown at 13a in order to remove sharp edges which would cut into and destroy the leather packing sleeves 27' as the same slides to and fro along the valve body when shifting the valve from "on" to "off" position or vice versa.

Figure 1:
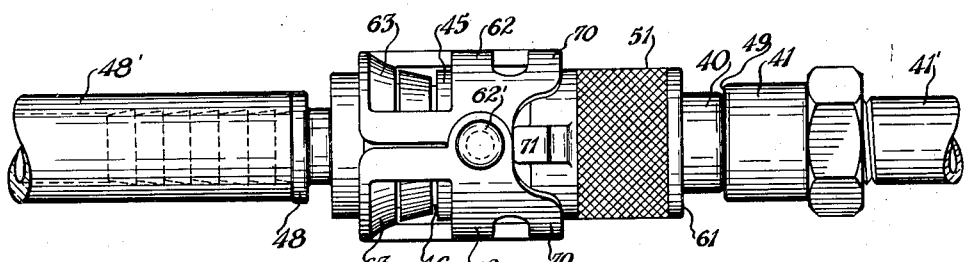
Figure 2:
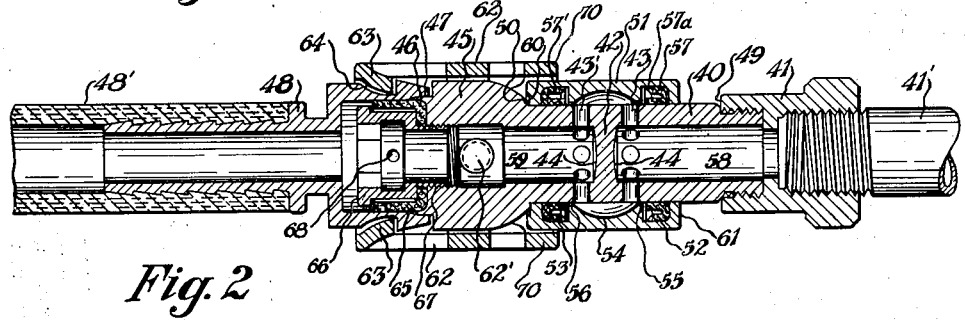
Fig. 2 is a longitudinal section through the improved valve and coupling for use in an air pressure line, the valve being shown in "on" position.
Figure 3:
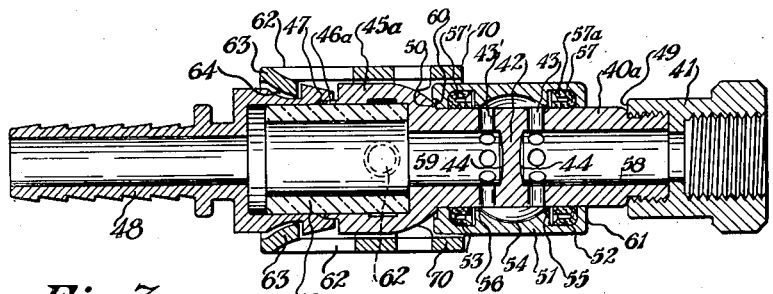
Fig. 3 is a longitudinal section through the improved valve and coupling for use in a water pressure line, the valve being shown in "on" position.
Figure 5:
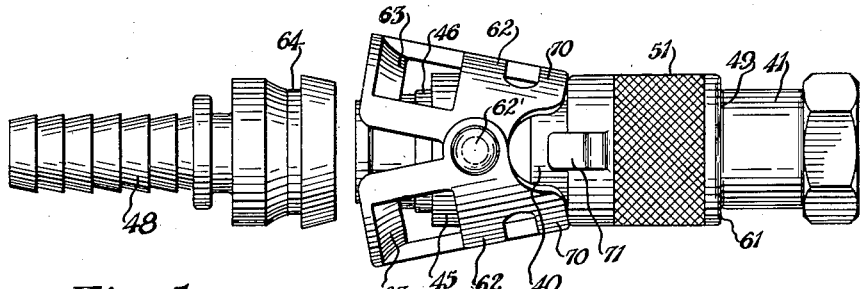
Fig. 5 is a side elevation similar to Fig. 1 showing the valve in "off" position with the clamping jaws opened, and the associated hose connection disconnected therefrom.
Figure 6:
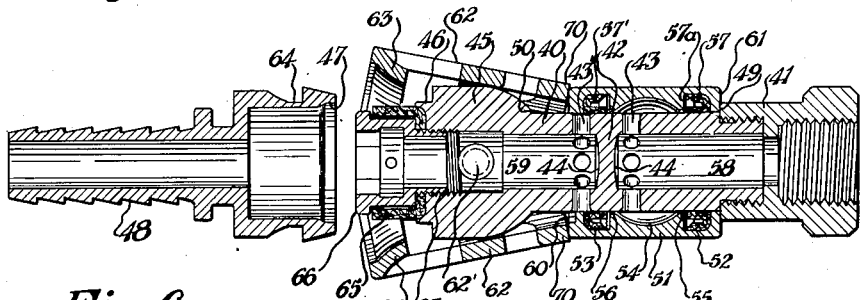
Fig. 6 is a longitudinal section of an air pressure line type device with the parts in the position shown in Fig. 5.
Figure 7:
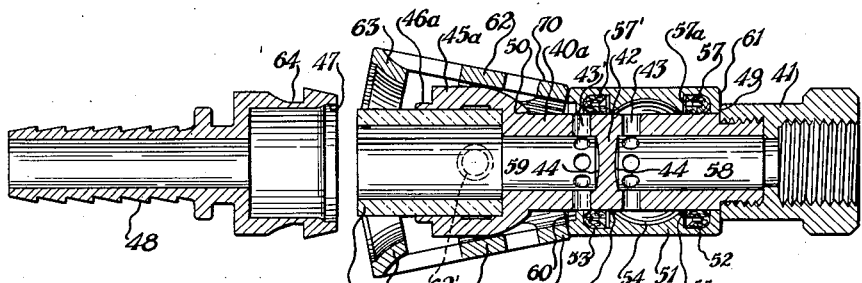
Fig. 7 is a longitudinal section of a water pressure line type device with the parts in the position shown in Fig. 5.
Figure 8:
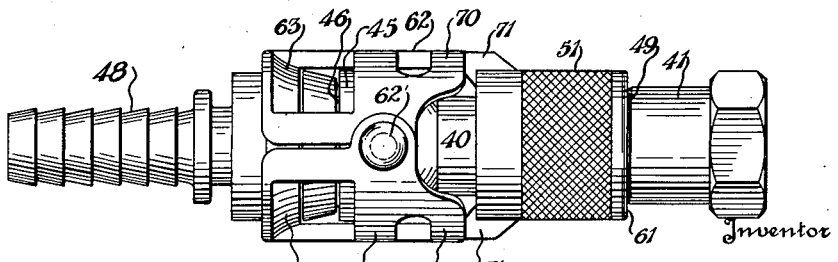
Fig. 8 is a side elevation of the improved valve and coupling of either the air or water pressure line type, showing the valve in "off" position with the coupling locked in coupled position.

The improved valve above described is shown in combination with an air line coupling in Figs. 2 and 6, and in combination with a water line coupling in Figs. 3 and 7; Figs. 1 and 5 being side elevations of the showings of Figs. 2 and 6 respectively, and side elevations of the valve and coupling shown in Figs. 3 and 7 respectively. Figs. 1, 2 and 3 show the valve in "on" position with the coupling locked in connected position, while Figs. 5, 6 and 7 shows the valves in "off" position with the couplings open and the connection adapters detached therefrom. Fig. 8 is a side elevation similar to Fig. 1 showing the valve in "off" position, with the coupling locked in connected position.

The constructions shown in Figs. 1, 2, 3, 5, 6, 7 and 8 include the air line valve body portion 40, or the water line valve body portion 40a, at one end of which is threaded the pipe connection adapter member 41. The valve bodies 40 or 40a are preferably tubular in shape and have preferably an integral disk 42 formed intermediate their ends for interrupting the flow of any fluid medium therethrough.

The tubular walls of the valve bodies 40 or 40a are provided with a plurality of by-pass ports 43 and 43', preferably arranged radially of the tubular valve bodies 40 or 40a adjacent each side face 44 of the disk 42.

One end 45 of the valve body 40 is provided with an annular projection 46 for being received within the recess 47 of a hose connection adapter member 48; while one end 45a of the valve body 40a is provided with an annular rib 46a for being received within the recessed portion 47 of a hose connection adapter member 48.

The hose connection adapter 48 may be attached to any suitable hose line 48', and the pipe connection adapter 41 may be screwed onto the threaded end of any suitable pipe 41', as shown in Figs. 1 and 2, in order to place the valve and coupling at the desired place in a pressure line.

It is pointed out that any form of pipe or hose connection adapter member may be provided in order to meet the particular circumstances of the pressure line in which the valve and coupling is to be located. Thus the hose connection adapter member 48 and the pipe connection adapter member 41 may be transposed, to connect with a reverse arrangement of pipe 41' and hose 48'. Likewise, both members 41 and 48 may be either hose connection adapter members, or pipe connection adapter members, or any other form of connection adapter members required for use.

The only restriction upon the selection of and arrangement of connection adapter members resides in the fact that there must be an annular face 49 on the adapter member 41, or its equivalent, located, with reference to the disk 42 and by-pass ports 43 and 43', substantially as shown in the drawings, in order to act as a stop for the valve sleeve 51 when the same is moved to "off" position as shown in Figs. 5, 6, 7 and 8.

Moreover, each valve body 40 or 40a is likewise provided with an annular face 50 which must be located, with reference to the disk 42 and by-pass ports 43 and 43', substantially as shown in the drawings in order to act as a stop for the valve sleeve 51 in "on" position as shown in Figs. 1, 2 and 3.

The valve sleeve 51 is preferably slidably and rotatably mounted on the tubular valve body 40 or 40a and is provided with two internal circumferential grooves 52 and 53 adjacent its end portions, there being a rounded internal circumferential groove 54 interposed between the grooves 52 and 53.

When the sleeve 51 is mounted on either the valve body 40 or 40a, sufficient clearance is provided at 55 and 56 for forming a communication between the groove 54 and the grooves 52 and 53 respectively, for permitting line pressure to act upon the U-shaped packing ring 57 and 57' located in the grooves 52 and 53.

These U-shaped packing rings 57 and 57' are preferably formed of leather, are interposed between the valve body 40 or 40a and the valve sleeve 51, and are located in the circumferential grooves 52 and 53 with the open side of the U of one packing ring 57 directed toward the open side of the U of the other packing ring 57'. It is pointed out that the upper annular edge of each packing ring 57 and 57' is bevelled at 57a in order to permit the body of leather to properly position and seat itself within the groove 52 or 53 without wrinkling.

The right hand bore 58 of each valve body 40 or 40a is located on the pressure line side of the valve, while the left hand bore 59 of the valve body 40 or 40a is located on the exhaust line side of the valve.

Thus, if air under pressure enters the bore 58 through the pipe 41', it would flow therefrom, through the by-pass ports 43, along the chamber formed by the internal annular groove 54 of the valve sleeve 51, through the by-pass ports 43', into the tubular exhaust side bore 59, and thence out through the exhaust side hose 48, when the valve is in "on" position as shown in Fig. 2. The valve shown in Fig. 3 is identically the same as the valve shown in Fig. 2 and the flow of water therethrough is the same as described for the combined valve and air line coupler shown in Fig. 2.

The full line pressure, whether it be air or water under pressure, being present in the chamber formed by the groove 54 acts through the communications 55 and 56 upon the U-shaped leather packing rings 57 and 57' to force the inner circumferential surface of the packing rings tightly in sealing relation against the outer peripheral surface of the valve body 40 or 40a. Thus as the pressure in the line increases, the effectiveness of the seals 57 and 57' also increases so as to positively prevent any leakage of the valve.

The action of the line pressure on the U-shaped packing rings also functions to hold the valve sleeve 51 at any position in which it is placed because of the pressure of the inner surface of the U-shaped packing rings against the valve body 40 or 40a. Accordingly, the valve will be unaffected by vibration and jarring or by any accidental blow from some external force not intended for changing the position of the valve sleeve.

The annular face 50 of the valve body 40 or 40a provides a stop or abutment for the left hand end face 60 of the valve sleeve 51, when the same is in "on" position as shown in Figs. 1, 2 and 3, so that the fluid in the pressure line in which the valve is interposed may be by-passed through the ports 43 and 43' and along the passage formed by the groove 54.

It is only necessary to slide or rotate the valve sleeve 51 longitudinally of the valve body 40 or 40a to bring the other end face 61 of the valve sleeve 51 in abutment against the end face 49 of the member 41 in order to position the valve in "off" position as shown in Figs. 5, 6, 7 and 8 so that the communication between the ports 43 and 43' is cut off as shown in Figs. 6 and 7.

The "off" position of the valve sleeve 21 shown in Fig. 4 is the same as the position of the valve sleeve 51 shown in Figs. 6 and 7, wherein the U-shaped packing ring 57' contacts with the outer peripheral surface of the valve body 40 or 40a between the by-pass ports 43 and 43'.

Clamping jaws 62 are pivotally connected at 62' with the end 45 or 45a of the valve body 40 or 40a, respectively; and the clamping jaws 62 are provided with engagement hooks 63 for engagement within the annular grooves 64 provided in the connection adapter member 48 in order to couple the same in connection with the valve body.

The air line type coupling shown in Figs. 2 and 6 is provided with a seal preferably in the form of a U-shaped leather cup 65 for sealing the joint between the recess 47 of the connection member 48, and the annular rib 46 of the valve body 40. The leather cup sealing member 65 is preferably held in assembled relation on the valve body 40 by the follower nut 66, which is threaded into the threaded bore 67 of the valve body 40.

The follower nut 66 is preferably provided with one or more apertures 68 for transmitting line pressure to the inner surface of the leather sealing cup 65, for increasing the effectiveness of its seal against the surface of the connection adapter member 48 engaged thereby as shown in Fig. 2.

Moreover, the follower nut 66 provides a protection for the leather cup 65 and provides means for aligning the connection adapter member 48 when the same is being pressed into engagement with the sealing cup 65 and valve body 40, from the position shown in Fig. 6 to the position shown in Fig. 2.

The water line type coupling shown in Figs. 3 and 7 includes a rubber sealing tube 69 carried by the end portion 45a of the valve body 40a for sealing the joint between the recessed portion 47 of the connection adapter member 48, and annular rib 46a of the valve body 40a when the same are in coupled relation as shown in Fig. 3. The pressure in the line presses the rubber sealing tube 69 tightly against the members to effectively seal the joint.

It is pointed out that when the valve sleeve 51 is in the "on" position as shown in Figs. 1, 2 and 3, the left hand end thereof is located underneath the right hand cam shaped ends 70 of the clamping jaws 62 so as to prevent the same from being pivoted on their pivots 62' for disconnecting the coupling when the valve is in "on" position and pressure is present in the exhaust side of the line.

Thus, when the valve sleeve 51 is moved to "off" position as shown in Figs. 5, 6 and 7, the left hand end of the valve sleeve 51 is removed from being located underneath the cam ends 70 of the clamping jaws 62 so that the same may be opened up to the position shown in Figs. 5, 6 and 7 for releasing the connection adapter member 48.

The valve sleeve 51 is provided with a plurality of cam follower lugs 71 which follow along the cam ends 70 of the clamping jaws 62 to force the sleeve 51 from "on" to "off" position when the sleeve 51 is rotated ninety degrees to the position shown in Fig. 8 of the drawings.

When the various parts of the valve and coupling are in the position shown in Fig. 8 of the drawings, the valve is in "off" position but the coupling is locked in coupled position, an arrangement which may be desired when a pneumatic tool or appliance valve on the exhaust side of the pressure line leaks.

The improved valve construction described herein provides a valve which may be readily and almost instantaneously operated from "on" to "off" position or vice versa by a simple longitudinal movement of the valve sleeve 21 or 51.

There is an absolute sealing of the valve by the U-shaped packing rings 27 and 27' or 57 and 57', which are rendered more effective for sealing the valve as the pressure in the line increases.

It is pointed out that when the valve is in "off" position as shown in Figs. 5 to 8, inclusive, the by-pass ports 43' are partially uncovered so that the exhaust side of the pressure line will bleed out through the by-pass ports 43'.

The improved construction provides a combined valve and coupling which has the numerous safety features described, and in which the coupling may be locked at will when the valve is in either "on" or "off" position.

I claim:

1. A combined valve and coupling including a by-pass valve body member, a valve sleeve mounted for movement on the valve body to "on" and "off" position, sealing means interposed between the valve body and sleeve, a connection member, clamping means carried by one of the members for holding the members in coupled relation, and the sleeve locking the clamping means in coupled position when the sleeve is in "on" position.

2. A combined valve and coupling including a by-pass valve body member, a valve sleeve mounted for movement on the valve body to "on" and "off" position, sealing means interposed between the valve body and sleeve, a connection member, clamping means carried by one of the members for holding the members in coupled relation, the sleeve locking the clamping means in coupled position when the sleeve is in "on" position, and stop means for the sleeve for "on" and "off" position.

3. A combined valve and coupling including a by-pass valve body member, a valve sleeve mounted for movement on the valve body to "on" and "off" position, sealing means interposed between the valve body and sleeve, a connection member, clamping means carried by one of the members for holding the members in coupled relation, the sleeve locking the clamping means in coupled position when the sleeve is in "on" position, and sealing means carried by one of the members for sealing the connection between the members when held in coupled relation by the clamping means.

4. A combined valve and coupling including a by-pass valve body member, a valve sleeve mounted for movement on the valve body to "on" and "off" position, sealing means interposed between the valve body and sleeve, a connection member, clamping means carried by one of the members for holding the members in coupled relation, the sleeve locking the clamping means in coupled position when the sleeve is in "on" position, and lugs on the sleeve locking the clamping means in coupled position when the valve sleeve is in "off" position.

5. A combined valve and coupling including a by-pass valve body member having a pressure side and an exhaust side, a valve sleeve mounted for movement on the valve body to "on" and "off" position, sealing means interposed between the valve body and sleeve, a connection member adapted for connection to the exhaust side of the valve body member, clamping means carried by one of the members for holding the members in coupled relation, the sleeve locking the clamping means in coupled position when the sleeve is in "on" position, and means for bleeding the exhaust side of the valve when the sleeve is in "off" position.

6. A combined valve and coupling including a by-pass valve body member, a valve sleeve mounted for movement on the valve body to "on" and "off" position, sealing means interposed between the valve body and sleeve, a connection member, clamping means carried by one of the members for holding the members in coupled relation, the sleeve locking the clamping means in coupled position when the sleeve is in "on" position, cup shaped sealing means for sealing the connection between the members when held in coupled relation by the clamping means, and means for clamping said cup shaped sealing means to one of the members.

In testimony that I claim the above, I have hereunto subscribed my name.

NATHAN C. HUNT.